United States Patent [19]
Kitagawa

[11] Patent Number: 5,273,817
[45] Date of Patent: Dec. 28, 1993

[54] PLASTIC MATERIAL FOR WRAPPING OVER AND CARRYING FOOD

[75] Inventor: Hiroji Kitagawa, Nagoya, Japan

[73] Assignee: Kitagawa Industries Co., Ltd., Japan

[21] Appl. No.: 775,262

[22] Filed: Oct. 11, 1991

[30] Foreign Application Priority Data

Oct. 12, 1990 [JP] Japan ................................ 2-274646
Oct. 12, 1990 [JP] Japan ................................ 2-274647

[51] Int. Cl.$^5$ .......................... D04H 1/58; A23B 4/00
[52] U.S. Cl. ................................... 428/288; 426/392; 426/410; 426/415; 428/375; 428/378; 428/379; 428/380; 428/389; 428/902; 428/903
[58] Field of Search .............. 428/408, 283, 288, 375, 428/378, 379, 380, 389, 902, 903; 426/392, 410, 415

[56] References Cited

U.S. PATENT DOCUMENTS

| | | | |
|---|---|---|---|
| 3,669,920 | 3/1972 | Haggis | 524/871 |
| 3,674,689 | 7/1972 | Giltrow et al. | 252/12.4 |
| 4,534,886 | 8/1985 | Kraus et al. | 252/502 |
| 4,663,230 | 5/1987 | Tennent | 428/367 |
| 4,752,415 | 6/1988 | Iwaskow et al. | 524/439 |
| 4,756,926 | 7/1988 | Yamada et al. | 427/41 |
| 4,816,184 | 3/1989 | Fukuda et al. | 252/511 |
| 4,852,453 | 8/1989 | Morin | 428/408 |
| 4,876,129 | 10/1989 | Akao | 428/408 |
| 5,102,647 | 4/1992 | Yamada et al. | 423/447.3 |

FOREIGN PATENT DOCUMENTS

| | | |
|---|---|---|
| 0100670 | 2/1984 | European Pat. Off. |
| 0112197 | 6/1984 | European Pat. Off. |
| 0379730 | 8/1990 | European Pat. Off. |
| 60-27700 | 2/1985 | Japan |
| 60-38472 | 2/1985 | Japan |
| 060026037 | 2/1985 | Japan |
| 060177031 | 9/1985 | Japan |
| 62242 | 1/1987 | Japan |
| 62-95351 | 5/1987 | Japan |
| 63-286437 | 11/1988 | Japan |
| 063272536 | 11/1988 | Japan |
| 001251511 | 10/1989 | Japan |
| 1486033 | 9/1977 | United Kingdom |
| 2114981 | 9/1983 | United Kingdom |

OTHER PUBLICATIONS

English Translation of Endo et al., Japanese Patent Publication No. 62-292 Jan. 7, 1987.
English Translation of Nakam et al., Japanese Patent Publication No. 60-26031 Feb. 8, 1985.

*Primary Examiner*—George F. Lesmes
*Assistant Examiner*—James D. Withers
*Attorney, Agent, or Firm*—Davis, Bujold & Streck

[57] ABSTRACT

The invention provides plastic material for wrapping or carrying food such as meat and vegetables without causing propagation of bacteria and germs.

The plastic material includes: a synthetic resin; and carbon fibers which are grown on fine powder of a refractory metal or a derivative thereof by thermolysis of hydrocarbons or vapor growth and plated with a metal laminate. A synthetic resin having sufficient flexibility is used as a base thereof when the plastic material is applied to a wrapping film, whereas a solid and tough synthetic resin is used when the plastic material is applied to a food-carrying member like a container or a tray. The metal laminate of the material gives excellent germicidal power to the material, and the ordered graphite structure of the carbon fibers gives sufficient strength to the material.

23 Claims, 6 Drawing Sheets

PLASTIC MATERIAL FOR WRAPPING OVER AND CARRYING FOOD

BACKGROUND OF THE INVENTION

The present invention relates to plastic material for wrapping over and carrying food such as meat and vegetables.

Plastic films are used for wrapping over food such as meat and vegetables to store the food separately in a refrigerator and to prevent oxidation and smell of the food. A plastic film, which is commonly made of flexible and air-tight material including polyethylene or other synthetic resins, is generally made very thin and directly wraps over the food.

When food like meat or vegetables is wrapped by such a film, some amount of the air is invariably included in the wrapping. Since the air containing various bacteria and germs is directly in contact with nutritious food like meat or vegetables, these bacteria and germs are propagated in the wrapping according to the conditions to putrefy and taint the wrapped food. Even when the food is stored in the refrigerator, some bacteria and germs are cold-resistant and may spoil the food rather quickly.

Another possible cause of putrefaction of the food is careless touch to the inner face of the wrapping film.

A plastic member like a container or a tray, which is light in weight but tough, is generally used for carrying food such as meat and vegetables. The plastic member has toughness and hardness sufficient to maintain its shape even when fresh food of a relatively large weight is held thereon.

Food including meat and vegetables is, in many cases, directly held on a container or a tray for transport and temporary storage. Pieces of meat or vegetables are adhered to the plastic container and may cause propagation of bacteria and germs in the hot weather or under conditions of insufficient washing.

SUMMARY OF THE INVENTION

The general objective of the invention is accordingly to provide plastic material which effectively preserves food and prevent propagation of bacteria and germs.

A specific objective of the invention is to provide an improved plastic film for wrapping and storing food such as meat and vegetables without causing propagation of bacteria and germs.

Another specific objective of the invention is to provide an improved plastic member for carrying and storing food such as meat and vegetables without causing propagation of bacteria and germs.

The above and other related objectives are realized by a flexible food-wrapping film including: a flexible synthetic resin; and carbon fibers which are grown on fine powder of a refractory metal or a derivative thereof by thermolysis of hydrocarbons or vapor growth and are plated with a metal laminate.

The flexible synthetic resin is a vinyl resin including polyethylene, polypropylene, poly(vinyl alcohol), and poly(vinyl chloride).

The carbon fibers used in the invention, not like common polyacrylonitrile or pitch carbon fibers, are whiskers grown on fine powder of a refractory metal or a derivative thereof to have a diameter virtually equal to that of the powder.

The refractory metal used herein is not vaporized at temperatures of thermolysis of hydrocarbons, that is, 950° C. to 1,300° C. Examples of such refractory metal include group IVa metals like titanium (Ti) and zirconium (Zr), group Va metals like vanadium (V) and niobium (Nb), group VIa metals like chromium (Cr) and molybdenum (Mo), group VIIa metals like manganese (Mn), group VIII metals like iron (Fe) and cobalt (Co); especially preferable are Fe, Co, Ni (nickel), V, Nb, Ta (tantalum), Ti, and Zr. The oxides, nitrides or other salts of the metals may alternatively be used.

The metal laminate, which is made of silver or includes an underlayer of copper and an overlayer of silver, is formed on the surface of the carbon fibers by electrolytic, non-electrolytic or vacuum plating. Other non-toxic metals may be used for the metal laminate.

The preferable amount of the carbon fibers plated with silver (Ag) or both silver and copper (Cu) is determined so as to ensure flexibility of the film and have excellent germicidal power to prevent propagation of bacteria and germs; that is, one to five percent by weight of the whole film.

The carbon fibers form an ordered graphite structure and possess excellent mechanical properties including proper tensile strength so as to give sufficient strength to the film, whereas the thin and flexible carbon fibers ensure sufficient flexibility of the film.

The carbon fibers plated with the germicidal metal laminate are very thin and uniformly dispersed in the whole film. The whole plastic wrapping film of the invention thus has sufficient germicidal power.

Another aspect of the invention is a food-carrying member including: a solid synthetic resin; and carbon fibers which are grown on fine powder of a refractory metal or a derivative thereof by thermolysis of hydrogen carbons or vapor growth, and plated with a metal laminate.

The metal laminate is made of either silver or copper, or includes plural layers of silver and copper. Other metals with excellent germicidal power may be used for the metal laminate.

The solid synthetic resin includes: hydrocarbon resins like polyethylene, polypropylene, polystyrene, and ABS resin; acrylic resins; vinyl acetate resins, halogen resins; polyester resins; polyamide resins; polyether resins; phenol resins; amino resins; polyurethane resins; and epoxy resins.

The carbon fibers plated with the metal laminate are disposed at least on the surface of the plastic member to be directly in contact with food, but uniform dispersion of the carbon fibers in the member is preferable. The food-carrying member of the invention accordingly possess excellent germicidal power to prevent propagation of bacteria and germs, which may putrefy and taint food held on the member. The ordered graphite structure of the carbon fibers gives sufficient strength to the plastic member of the invention.

BRIEF DESCRIPTION OF THE DRAWINGS

The invention may be best understood by referring to the following detailed description of the preferred embodiments and the accompanying drawings, wherein like numerals denote like elements and in which:

FIG. 4A is a schematic view showing the spiral rotation within the plating bath;

DESCRIPTION OF THE PREFERRED EMBODIMENTS

Figure 1:
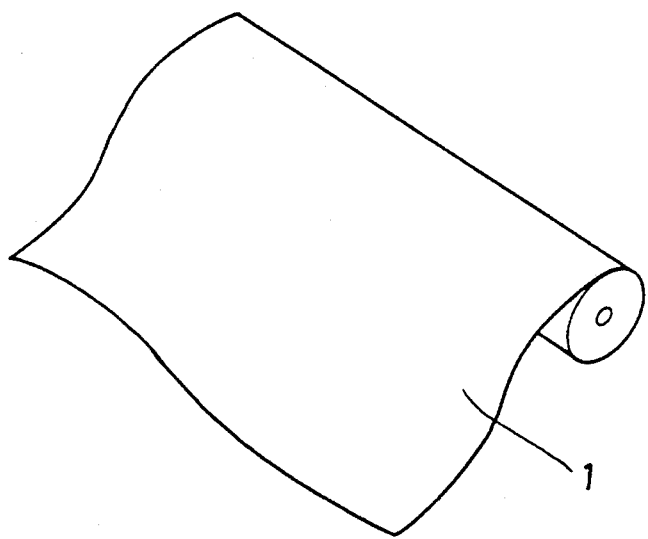
FIG. 1 is a perspective view illustrating a food-wrapping film of a first embodiment according to the invention.
Figure 5:
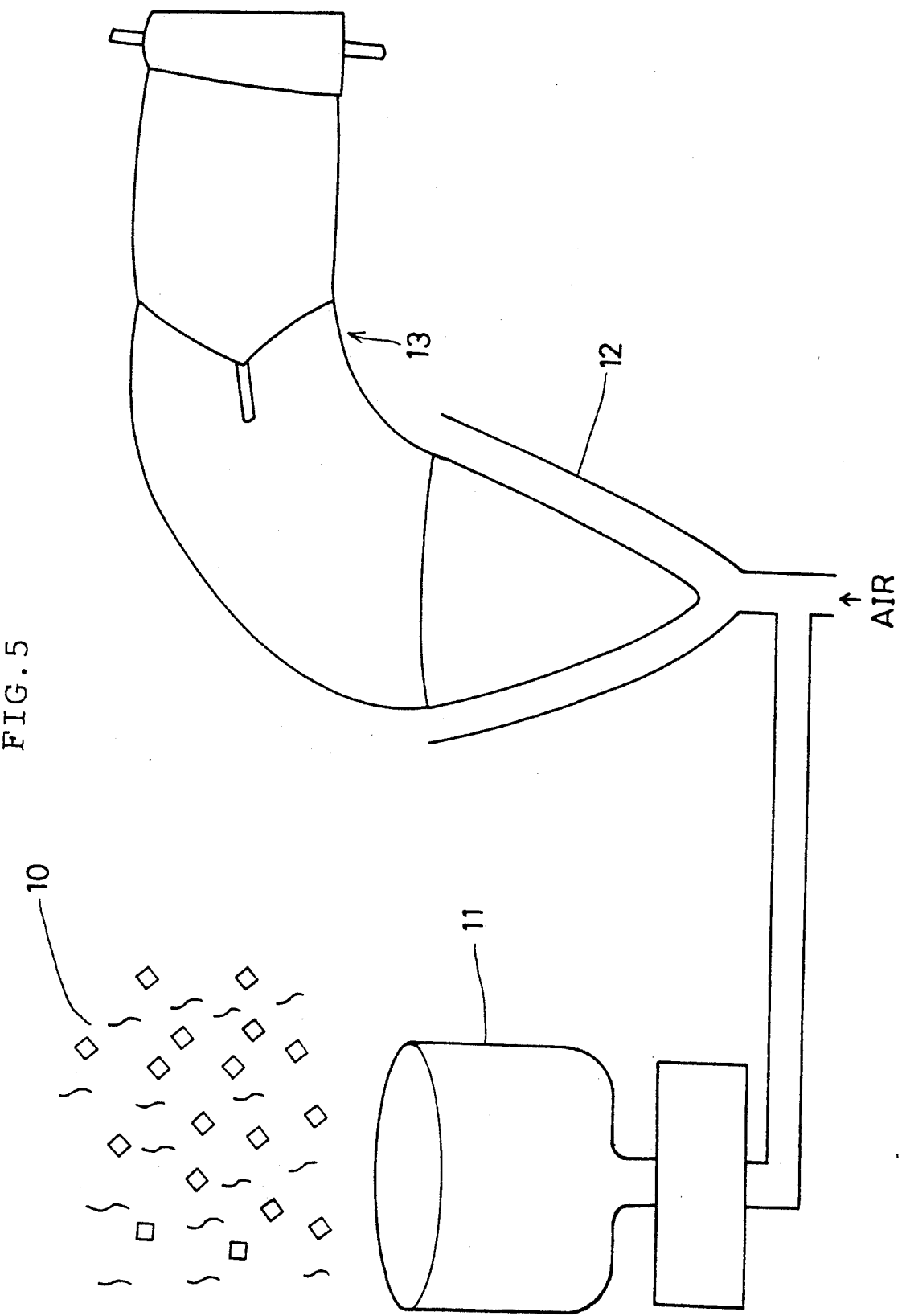
FIG. 5 is a schematic view showing manufacture of the film of FIG. 1.

A first embodiment of the invention, a food-wrapping film 1, is explained in detail based on FIGS. 1 and 5.

The food-wrapping film 1 includes: a thin and flexible synthetic resin like polyethylene, poly(vinyl chloride), or polypropylene; and very thin carbon fibers 2 mixed with the synthetic resin.

Figure 2:
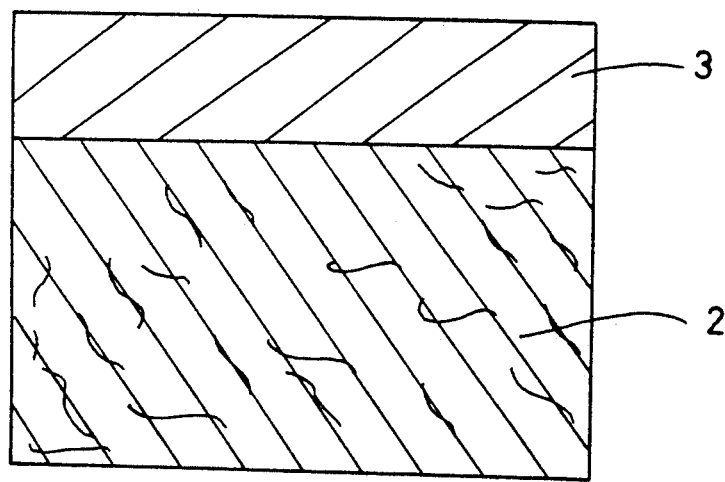
FIG. 2 is a cross sectional view illustrating a carbon fiber contained in the film of FIG. 1.
Figure 3:
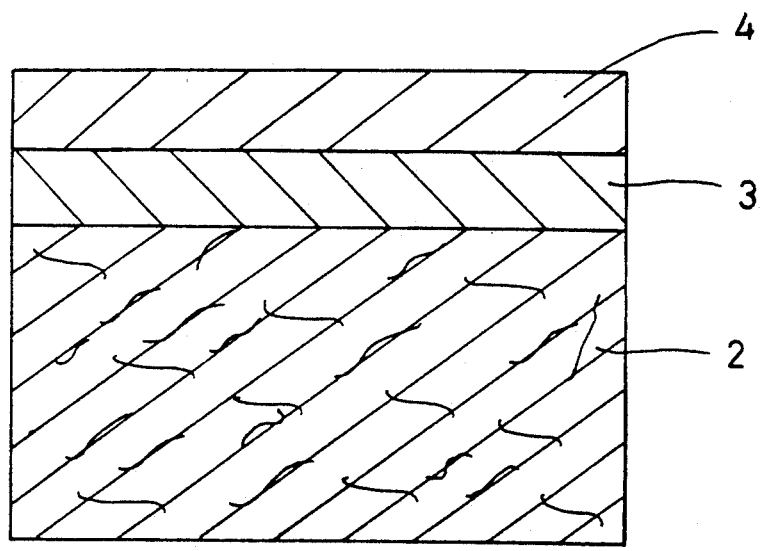
FIG. 3 is a cross sectional view illustrating another structure of the carbon fiber.

The carbon fiber 2 is plated with a silver laminate 3 of 0.1 to 2 micrometer thick as shown in FIG. 2, or alternatively plated with an undercoat of copper laminate 3 and an overcoat of silver laminate 4 of 0.1 to 2 micrometer thick as shown in FIG. 3 by a known method like vacuum, electrolytic, or non-electrolytic plating (in the embodiment, electrolytic plating).

Manufacture of the wrapping film 1 is described in detail hereinafter.

The carbon fibers 2 plated with the copper laminate 4 and the silver laminate 3 are prepared in the following manner.

The carbon fibers 2 (diameter: 0.1 to 10 micrometer; length: 0.1 to 1 millimeter) are grown on fine powdery iron in a furnace of 950° C. to 1,300° C. by thermolysis of benzene or vapor growth.

Figure 4:
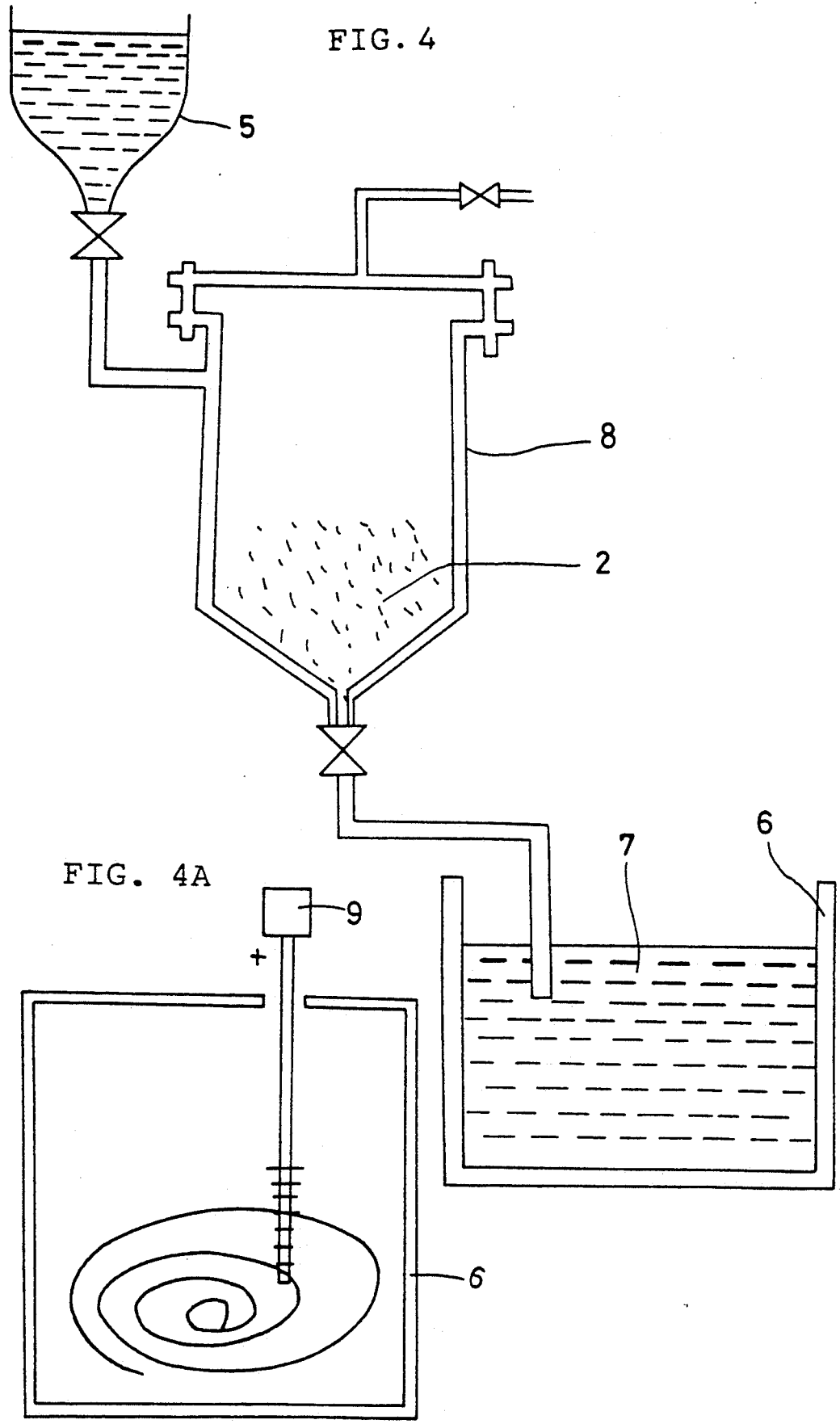
FIG. 4 is a schematic view showing manufacture of the carbon fiber plated with a metal laminate.

As shown in FIG. 4, the obtained carbon fibers 2 are placed in a container 8, which is evacuated by a vacuum pump (not shown), and mixed with water supply from a tank 5 little by little so as to form slurry. The slurry is then applied to a plating bath 6 filled with a plating solution 7 of 1:10 copper sulfide/sulfuric acid, which is maintained at a temperature of 25° C. and stirred with a magnetic stirrer (not shown) at such a speed that the carbon fibers 2 are spirally rotated on the bottom of the container 8. A metal plate (not shown) is disposed on the bottom of the plating bath 6 for better contact of the carbon fibers 2 with a cathode 9. Electricity is supplied to the plating bath 6 for ten minutes, so that the carbon fibers 2 are plated with copper. After the copper-plated carbon fibers 2 are washed with water and processed in a known method, they are further dipped in a plating bath of silver cyanide (pH 12) maintained at 25° C. and plated with silver by supply of electricity for ten minutes. The silver-plated carbon fibers 2 are washed well with water.

Accordingly, the carbon fibers 2 are plated with copper of 0.8 micrometer thick and silver of 0.5 micrometer thick.

The plated carbon fibers 2 are mixed with the synthetic resin at 5 to 10 percent by weight of the whole film 1 as shown in FIG. 5.

Pellets of the synthetic resin and the carbon fibers 10 are fed into a hopper 11, and carried into a blender 12 by an air flow. In the blender 12, the pellets 10 are dry-blended, extruded as strands of circular or rectangular cross section, and cut into pieces of a predetermined length as mixed pellets in an extruder 13.

The mixed pellets are molten and extruded to form the thin and flexible film 1.

The plastic film 1 thus manufactured includes carbon fibers 2 plated with the silver laminate 3 or the copper and silver laminates 3 and 4, and thereby possesses excellent germicidal power to prevent propagation of bacteria and germs.

The plastic film 1 also has favorable flexibility to wrap over food like meat or vegetables efficiently so as to prevent smell of the food or leakage of water or liquid contained in the food. The ordered graphite structure of the carbon fibers 2 gives sufficient strangth and durability to the plastic film 1.

Figure 6:
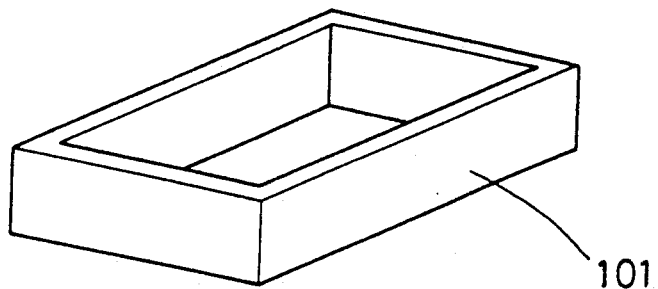
FIG. 6 is a perspective view illustrating a food-carrying plastic member of a second embodiment according to the invention.

A second embodiment of the invention, a plastic tray 101, is shown in FIG. 6.

The rectangular tray 101 used for carrying food such as meat and vegetable includes: a solid and tough synthetic resin base, for example, poly(vinyl chloride), polypropylene, and ABS resin; and carbon fibers 2 mixed with the synthetic resin.

The carbon fiber 2 is plated with a metal laminate 3 of either copper or silver of 0.1 to 2 micrometer thick as shown in FIG. 2, or alternatively plated with two metal laminates 3 and 4 of copper and silver as shown in FIG. 3.

The carbon fibers 2 plated with the metal laminate 3 or laminates 3 and 4 are disposed at least on the surface of the tray 101 to be directly in contact with food, but uniform dispersion of the carbon fibers 2 in the tray 101 is preferable.

The plastic tray 101 is manufactured in a similar manner to the film 1 of the first embodiment. The only difference is that the mixed pellets of the synthetic resin and the plated carbon fibers 2 are formed to a predetermined shape of the tray 101 by injection molding.

The plastic tray 101 of the invention includes carbon fibers 2 plated with the metal laminate 3 or laminates 3 and 4, and thereby possesses excellent germicidal power to prevent propagation of bacteria and germs.

When the carbon fibers 2 are uniformly dispersed in the synthetic resin, the whole tray 101 has germicidal power.

The solid and tough synthetic resin used as a base of the tray 101 is further reinforced by the ordered graphite structure of the carbon fibers 2; accordingly, the tray 101 is not easily damaged.

Since there may be many modifications and changes without departing from the scope of the invention, the embodiments above are not intended to limit the invention to the embodiments but are intended to illustrate the invention more clearly.

What is claimed is:

1. A flexible food-wrapping film comprising:
   a flexible synthetic resin film; and
   carbon fibers which are grown on fine powder of a refractory metal or a derivative thereof by thermolysis of hydrocarbons or vapor growth and plated with a coating of silver, said coating of silver having an underlayer of copper said carbon fibers being uniformly dispersed throughout the film.

2. A flexible film in accordance with claim 1, wherein the flexible synthetic resin is polyethylene, poly(vinyl chloride), or polypropylene.

3. A flexible film in accordance with claim 1, wherein the refractory metal has a vaporization temperature above a temperature of thermolysis of hydrocarbons.

4. A flexible film in accordance with claim 3, wherein the refractory metal is chosen from a group consisting of IVa, Va, VIa, VIIa, and VIII metals.

5. A flexible film in accordance with claim 4, wherein the refractory metal is titanium, zirconium, vanadium, niobium, iron, cobalt, nickel, or tantalum.

6. A flexible film in accordance with claim 1, wherein the derivative of the refractory metal is an oxide or a nitride.

7. A flexible film in accordance with claim 1, wherein the silver coating is formed on the surface of the carbon fibers by electrolytic, non-electrolytic or vacuum plating.

8. A flexible film in accordance with claim 1, wherein the content of the carbon fibers coated with silver is one to five percent by weight of the whole film.

9. A flexible film in accordance with claim 1, wherein the synthetic resin and the carbon fibers are mixed by dry blend.

10. A flexible film in accordance with claim 9, wherein the synthetic resin and the carbon fibers blended are formed to a shape by molten extrusion.

11. A food-carrying member comprising:
a solid synthetic resin film; and
carbon fibers which are grown on fine powder of a refractory metal or a derivative thereof by thermolysis of hydrogen carbons or vapor growth, and plated with a coating of silver, said coating of silver having an underlayer of copper, said carbon fibers being disposed at least on the surface of the film.

12. A member in accordance with claim 11, wherein the solid synthetic resin is chosen from a group consisting of polyethylene, polypropylene, polystyrene, ABS resin; acrylic resins; vinyl acetate resins, halogen resins; polyester resins; polyamide resins; polyether resins; phenol resins; amino resins; polyurethane resins; and epoxy resins.

13. A member in accordance with claim 11, wherein the refractory metal has a vaporization temperature above a temperature of thermolysis of hydrocarbons, that is, above 950° C.

14. A member in accordance with claim 13, wherein the refractory metal is chosen from a group consisting of IVa, Va, VIa, VIIa, and VIII metals.

15. A member in accordance with claim 14, wherein the refractory metal is titanium, zirconium, vanadium, niobium, iron, cobalt, nickel, or tantalum.

16. A member in accordance with claim 11, wherein the derivative of the refractory metal is an oxide or a nitride.

17. A member in accordance with claim 11, wherein the silver coated carbon fibers are uniformly dispersed throughout the food-carrying member.

18. A member in accordance with claim 11, wherein the silver coated carbon fibers are disposed at least on a surface of the food-carrying member to be contacted by the desired food product.

19. A member in accordance with claim 11, wherein the silver coating is formed on the surface of the carbon fibers by electrolytic, non-electrolytic or vacuum plating.

20. A member in accordance with claim 11, wherein the content of the carbon fibers plated with silver is one to five percent by weight of the whole member.

21. A member in accordance with claim 11, wherein the synthetic resin and the carbon fibers are mixed by dry blend.

22. A member in accordance with claim 24, wherein the synthetic resin and the carbon fibers blended are formed to a shape by injection molding.

23. A tray comprising:
a solid synthetic resin; and
carbon fibers which are grown on fine powder of a refractory metal or a derivative thereof by thermolysis of hydrogen carbons or vapor growth, and plated with a coating of silver, said coating of silver having an underlayer of copper; and
the silver coated carbon fibers forming an ordered graphite structure and being uniformly dispersed throughout the tray.

* * * * *